US011306563B2

(12) United States Patent
Valleru et al.

(10) Patent No.: US 11,306,563 B2
(45) Date of Patent: Apr. 19, 2022

(54) DRILLING RIG COMMUNICATION SYSTEMS, DEVICES, AND METHODS (71) Applicant: Nabors Drilling Technologies USA, Inc., Houston, TX (US)

(72) Inventors: Sri Valleru, Spring, TX (US); Eric D. Sawyer, Houston, TX (US); Divye Kumar, Houston, TX (US)

(73) Assignee: NABORS DRILLING TECHNOLOGIES USA, INC., Houston, TX (US)

( * ) Notice: Subject to any disclaimer, the term of this patent is extended or adjusted under 35 U.S.C. 154(b) by 132 days.

(21) Appl. No.: 15/887,729

(22) Filed: Feb. 2, 2018

(65) Prior Publication Data
US 2019/0242219 A1    Aug. 8, 2019

(51) Int. Cl.
E21B 41/00 (2006.01)
E21B 47/00 (2012.01)
G06Q 10/06 (2012.01)
G06Q 50/02 (2012.01)

(52) U.S. Cl.
CPC .......... *E21B 41/0092* (2013.01); *E21B 47/00* (2013.01); *G06Q 10/06314* (2013.01); *G06Q 50/02* (2013.01)

(58) Field of Classification Search
CPC ................ E21B 41/0092; E21B 47/00; G06Q 10/06314; G06Q 50/02
USPC ....................................................... 705/7.24
See application file for complete search history.

(56) References Cited

U.S. PATENT DOCUMENTS

| 8,121,971 | B2* | 2/2012 | Edwards | G06N 5/025 706/50 |
| 9,785,899 | B2* | 10/2017 | Benayon | G06Q 10/06 |
| 2002/0082967 | A1* | 6/2002 | Kaminsky | G06Q 40/08 705/37 |
| 2007/0038376 | A1* | 2/2007 | Beck | G06F 30/00 702/6 |
| 2009/0094075 | A1* | 4/2009 | Parisien | G06Q 10/0875 705/7.12 |
| 2010/0147510 | A1* | 6/2010 | Kwok | G01V 11/00 166/250.01 |
| 2012/0022898 | A1* | 1/2012 | Koa | G06Q 40/08 705/4 |

(Continued)

FOREIGN PATENT DOCUMENTS

WO    WO2008091775    7/2008

OTHER PUBLICATIONS

Mahmoud Lotfy ElGizawy, "Continuous Measurement-While-Drilling Surveying System Utilizing MEMS Inertial Sensors", Schulich School of Engineering, Department of Geomatics Engineering, 2009 (Year: 2009).*

(Continued)

*Primary Examiner* — Rutao Wu
*Assistant Examiner* — Abdallah A El-Hage Hassan
(74) *Attorney, Agent, or Firm* — Haynes and Boone, LLP (57) ABSTRACT Systems, devices, and methods for carrying out communications on a drilling rig are presented. A drilling collaboration platform may be used to schedule tasks on the drilling rig and communicate with third parties. The drilling collaboration platform may be configured to generate vendor lists, send notifications and alerts to third parties, generate forms required for completing tasks, and gather data from the drilling rig.

8 Claims, 7 Drawing Sheets

(56) References Cited

U.S. PATENT DOCUMENTS

| | | | | |
|---|---|---|---|---|
| 2014/0074339 | A1* | 3/2014 | Casado | G05D 1/104 |
| | | | | 701/24 |
| 2014/0365313 | A1* | 12/2014 | Reese | G06Q 30/0269 |
| | | | | 705/14.66 |
| 2015/0053483 | A1* | 2/2015 | Mebane, III | E21B 7/00 |
| | | | | 175/26 |
| 2015/0294258 | A1* | 10/2015 | Hildebrand | G06Q 10/06312 |
| | | | | 705/7.15 |
| 2018/0075372 | A1* | 3/2018 | Job | G06Q 10/04 |
| 2018/0298746 | A1* | 10/2018 | Short | E21B 19/008 |
| 2019/0170898 | A1* | 6/2019 | Contreras Otalvora | |
| | | | | E21B 44/00 |

OTHER PUBLICATIONS

Soner Emec*, Jörg Krüger, "Online fault-monitoring in machine tools based on energy consumption analysis and non-invasive data acquisition for improved resource-efficiency" Department of Machine Tools and Factory Management, Berlin Institute of Technology, Pascalstr. 8, Berlin 10587, Science Direct (Year: 2016).*

* cited by examiner

DRILLING RIG COMMUNICATION SYSTEMS, DEVICES, AND METHODS

TECHNICAL FIELD

The present disclosure is directed to systems, devices, and methods for providing communications for drilling systems. In particular, the present disclosure includes receiving and managing data from a drilling rig and external sources, generating and updating drilling rig schedules, and managing communications with third parties to perform tasks on a drilling rig.

BACKGROUND OF THE DISCLOSURE

At the outset of a drilling operation, an operator typically establishes a schedule including various tasks required to complete the operation. These tasks generally must be accomplished on a precise schedule and in a defined sequence to minimize time losses. The tasks may include surveying, excavation, drilling, casing, cementing, and other oilfield services which may be performed by employees on the drilling rig, as well as third parties. For example, a drilling operation may include a surveying task which may be carried out by a first third party vendor, a drilling task which may be carried out by a drilling contractor, and a casing task which may be carried out by a third vendor.

The use of various third parties to complete specific tasks during a drilling operation may increase the overall efficiency of the drilling operation. However, scheduling third parties to perform tasks may be an organizationally complex process based on availability of the third parties, changing conditions on the drilling rig, and unforeseen delays. Furthermore, operators of the drilling rig may need to dedicate inordinate amounts of time to scheduling with third parties because mistakes in scheduling can lead to delays in the drilling operation which translate to high costs. Although some scheduling tools are available in existing drilling rig communication systems, these tools lack the ability to efficiently schedule and update tasks intelligently and across various third parties. For example, operators are often required to manually enter data into schedules based on changing conditions. Furthermore, existing scheduling tools are not equipped to facilitate communication with third parties. Failures in scheduling and communicating with third parties may lead to delays and costly errors in drilling operations. Therefore, a more efficient, reliable, and intuitive drilling communication and collaboration system is needed.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes many different implementations, or examples, for implementing different features of various implementations. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various implementations and/or configurations discussed.

This disclosure introduces systems and methods to carry out communications on a drilling rig, as well as with third parties to complete tasks on the drilling rig. In particular, the present disclosure includes a drilling collaboration platform (also known as a drilling communication system or drilling hub) that may include a controller configured to generate and update schedules and facilitate communications with third parties. For example, the drilling collaboration platform may serve as a hub for tracking operations and communicating between all parties involved with operations at the drilling rig. The drilling collaboration platform may include one or more controllers on the drilling rig itself and may be configured to receive measurements from sensors on the drilling rig. The drilling collaboration platform may provide improvements over existing communications systems, for example organizing data from many sources (including sensors on a drilling rig and third parties) and providing this information in a format that is easy to understand. The drilling collaboration platform may include dedicated modules for completing tasks on the drilling rig including a scheduling module, a Request For Quote (RFQ)/bid module, a reporting module, a messaging/alerts module, and a field ticket module that may be used by a third party of capture pertinent details to the operations and automatically process and present information to the operator.

Figure 1:
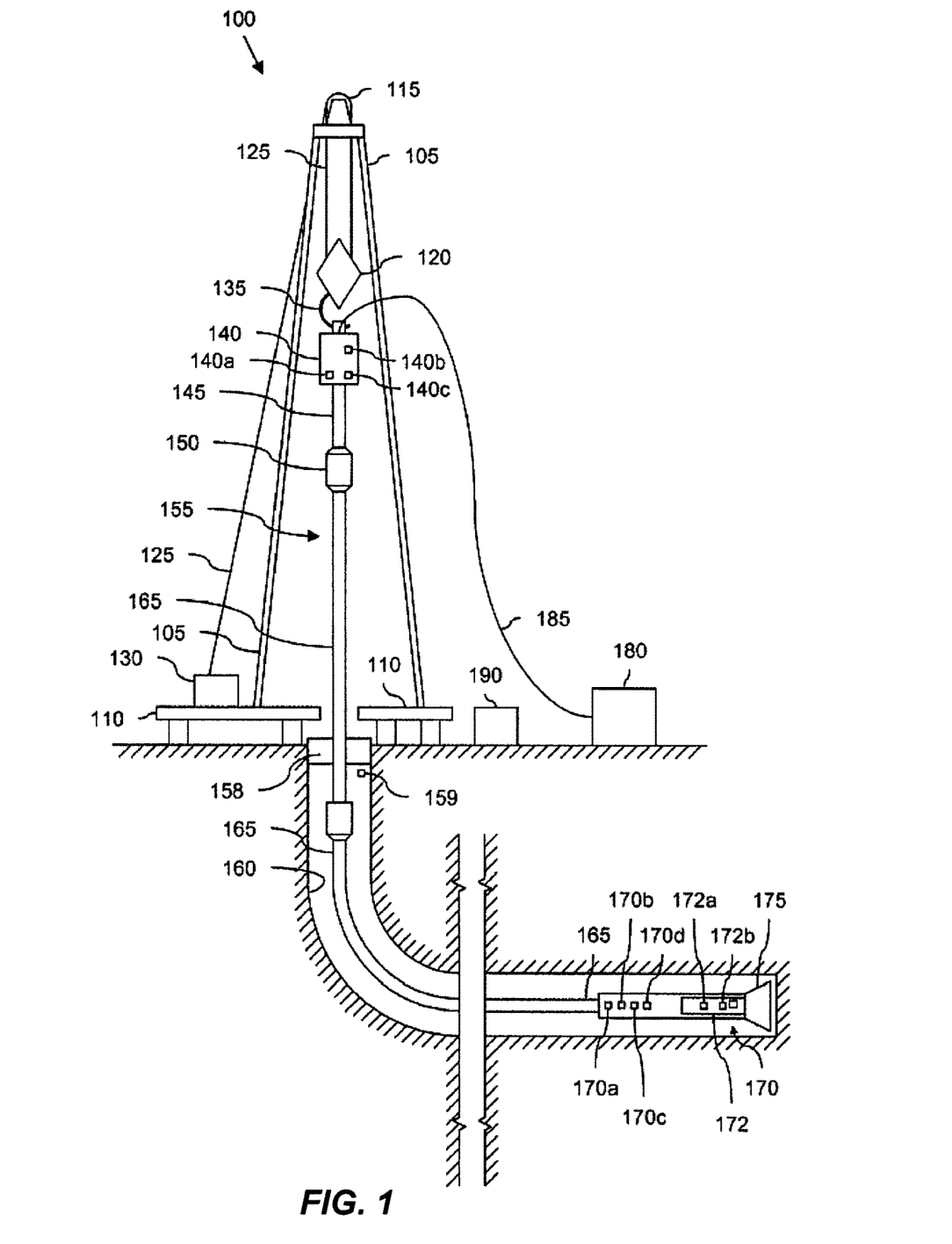
FIG. 1 is a schematic diagram of an exemplary drilling apparatus according to one or more aspects of the present disclosure.

Referring to FIG. 1, illustrated is a schematic view of a drilling apparatus 100 demonstrating one or more aspects of the present disclosure. The apparatus 100 is or includes a land-based drilling rig. However, one or more aspects of the present disclosure are applicable or readily adaptable to any type of drilling rig, such as jack-up rigs, semisubmersibles, drill ships, coil tubing rigs, well service rigs adapted for drilling and/or re-entry operations, and casing drilling rigs, among others within the scope of the present disclosure.

Apparatus 100 includes a mast 105 supporting lifting gear above a rig floor 110. The lifting gear includes a crown block 115 and a traveling block 120. The crown block 115 is coupled at or near the top of the mast 105, and the traveling block 120 hangs from the crown block 115 by a drilling line 125. One end of the drilling line 125 extends from the lifting gear to drawworks 130, which is configured to reel in and out the drilling line 125 to cause the traveling block 120 to be lowered and raised relative to the rig floor 110. The other end of the drilling line 125, known as a dead line anchor, is anchored to a fixed position, possibly near the drawworks 130 or elsewhere on the rig.

A hook 135 is attached to the bottom of the traveling block 120. A top drive 140 is suspended from the hook 135. A quill 145 extending from the top drive 140 is attached to a saver sub 150, which is attached to a drill string 155 suspended within a wellbore 160. Alternatively, the quill 145 may be attached to the drill string 155 directly. The term "quill" as used herein is not limited to a component which directly extends from the top drive, or which is otherwise conventionally referred to as a quill. For example, within the scope of the present disclosure, the "quill" may additionally or alternatively include a main shaft, a drive shaft, an output shaft, and/or another component which transfers torque, position, and/or rotation from the top drive or other rotary driving element to the drill string, at least indirectly. Nonetheless, albeit merely for the sake of clarity and conciseness, these components may be collectively referred to herein as the "quill."

The drill string 155 includes interconnected sections of drill pipe 165, a bottom hole assembly (BHA) 170, and a drill bit 175. The BHA 170 may include stabilizers, drill collars, and/or measurement-while-drilling (MWD) or wireline conveyed instruments, among other components. In some implementations, the BHA 170 includes a bent housing drilling system.

Implementations using bent housing drilling systems may require slide drilling techniques to effect a turn using directional drilling. For the purpose of slide drilling, the bent housing drilling systems may include a down hole motor with a bent housing or other bend component operable to create an off-center departure of the bit from the center line of the wellbore. The direction of this departure from the centerline in a plane normal to the centerline is referred to as the "toolface angle." The drill bit 175, which may also be referred to herein as a "tool," may have a "toolface," connected to the bottom of the BHA 170 or otherwise attached to the drill string 155. One or more pumps 180 may deliver drilling fluid to the drill string 155 through a hose or other conduit, which may be connected to the top drive 140.

The down hole MWD or wireline conveyed instruments may be configured for the evaluation of physical properties such as pressure, temperature, torque, weight-on-bit (WOB), vibration, inclination, azimuth, toolface orientation in three-dimensional space, and/or other down hole parameters. These measurements may be made down hole, stored in memory, such as solid-state memory, for some period of time, and downloaded from the instrument(s) when at the surface and/or transmitted in real-time to the surface. Data transmission methods may include, for example, digitally encoding data and transmitting the encoded data to the surface, possibly as pressure pulses in the drilling fluid or mud system, acoustic transmission through the drill string 155, electronic transmission through a wireline or wired pipe, transmission as electromagnetic pulses, among other methods. The MWD sensors or detectors and/or other portions of the BHA 170 may have the ability to store measurements for later retrieval via wireline and/or when the BHA 170 is tripped out of the wellbore 160.

In an exemplary implementation, the apparatus 100 may also include a rotating blow-out preventer (BOP) 158 that may assist when the well 160 is being drilled utilizing under-balanced or managed-pressure drilling methods. The apparatus 100 may also include a surface casing annular pressure sensor 159 configured to detect the pressure in an annulus defined between, for example, the wellbore 160 (or casing therein) and the drill string 155.

In the exemplary implementation depicted in FIG. 1, the top drive 140 is utilized to impart rotary motion to the drill string 155. However, aspects of the present disclosure are also applicable or readily adaptable to implementations utilizing other drive systems, such as a power swivel, a rotary table, a coiled tubing unit, a down hole motor, and/or a conventional rotary rig, among others.

The apparatus 100 also includes a controller 190 configured to control or assist in the control of one or more components of the apparatus 100. For example, the controller 190 may be configured to transmit operational control signals to the drawworks 130, the top drive 140, the BHA 170 and/or the pump 180. The controller 190 may be a stand-alone component installed on the drilling apparatus 100 itself or may be disposed adjacent the drilling apparatus 100. In an exemplary implementation, the controller 190 includes one or more systems located in a control room in communication with other components of the apparatus 100, such as a general purpose shelter often referred to as the "doghouse" serving as a combination tool shed, office, communications center, and general meeting place. The controller 190 may be configured to transmit the operational control signals to the drawworks 130, the top drive 140, the BHA 170, and/or the pump 180 via wired or wireless transmission devices which, for the sake of clarity, are not depicted in FIG. 1.

Figure 2:
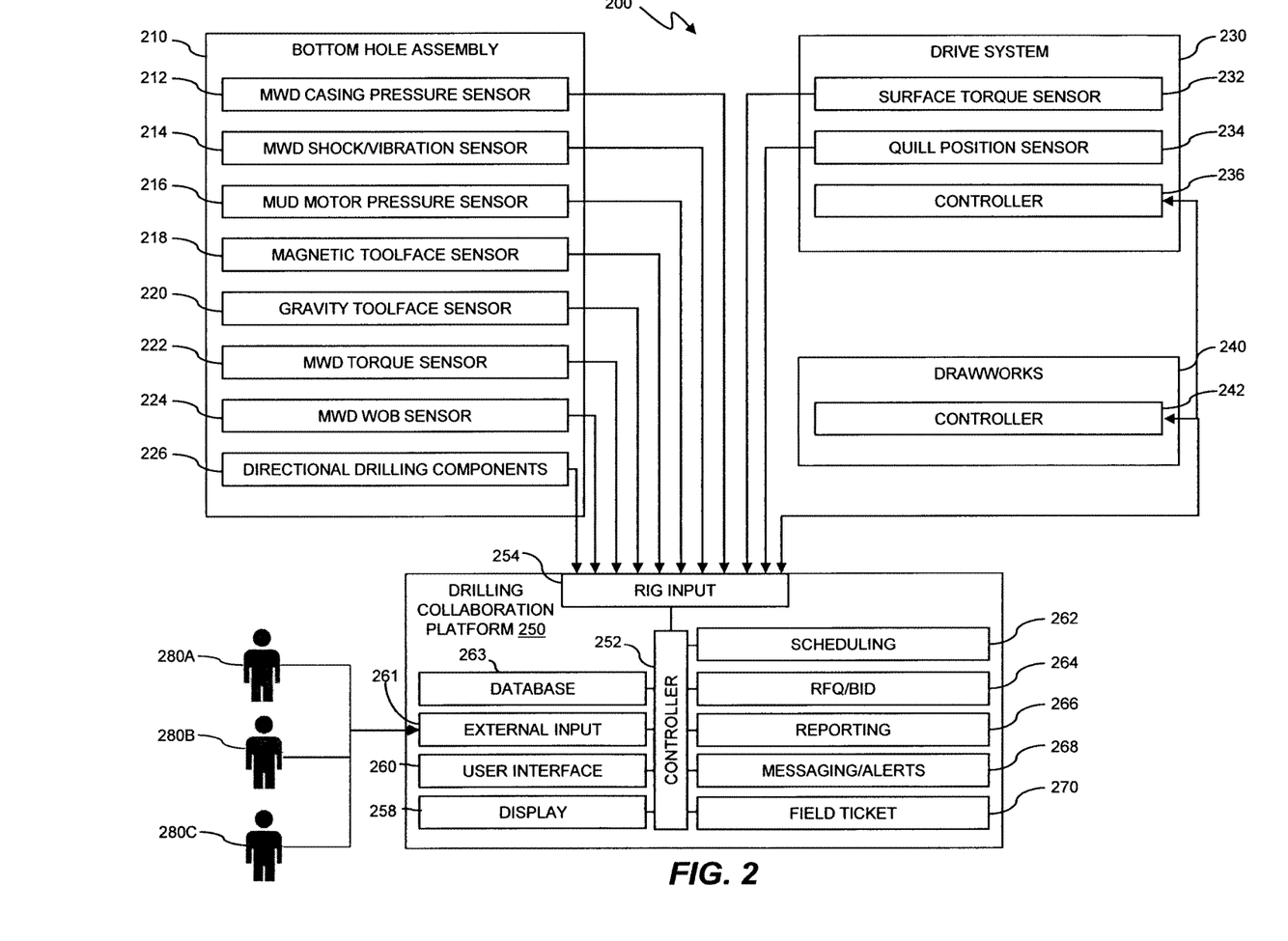
FIG. 2 is a schematic diagram of an exemplary drilling collaboration platform according to one or more aspects of the present disclosure.

In some implementations, the controller 190 forms part of a larger drilling collaboration platform and may form a part of a drilling collaboration platform 250 (as shown in FIG. 2) forming a part of the drilling collaboration platform. The drilling collaboration platform 250 is a system that may be configured to schedule tasks and carry out communications with various parties to carry out drilling operations of the apparatus 100. For example, the controller 190 may receive data from the various sensors on the drilling rig and communicate this data to the drilling collaboration platform 250 which carries out further processing of the data. In other implementations, the controller 190 serves as the main processor for the drilling collaboration platform 250. In this case, the controller 190 may be configured to generate schedules, communicate with third parties, and automatically create field tickets and task reports. As used herein, "third parties" may refer to workers that are not regular employees of the drilling rig. For example, third parties may include people, teams, or organizations hired to carry out a task or function relating to the drilling rig apparatus. Third parties may include contractors, contracted vendors, part-time workers, specialized crews, surveying teams, and other individuals that are not part of the regular drilling crew.

The controller 190 may be configured to receive electronic signals via wired or wireless transmission devices (also not shown in FIG. 1) from a variety of sensors included in the apparatus 100, where each sensor is configured to detect an operational characteristic or parameter. Depending on the implementation, the apparatus 100 may include a down hole annular pressure sensor 170a coupled to or otherwise associated with the BHA 170. The down hole annular pressure sensor 170a may be configured to detect a pressure value or range in an annulus shaped region defined between the external surface of the BHA 170 and the internal diameter of the wellbore 160, which may also be referred to as the casing pressure, down hole casing pressure, MWD casing pressure, or down hole annular pressure. Measurements from the down hole annular pressure sensor 170a may include both static annular pressure (pumps off) and active annular pressure (pumps on).

It is noted that the meaning of the word "detecting," in the context of the present disclosure, may include detecting, sensing, measuring, calculating, and/or otherwise obtaining data. Similarly, the meaning of the word "detect" in the context of the present disclosure may include detect, sense, measure, calculate, and/or otherwise obtain data.

The apparatus 100 may additionally or alternatively include a shock/vibration sensor 170b that is configured to detect shock and/or vibration in the BHA 170. The apparatus 100 may additionally or alternatively include a mud motor pressure sensor 172a that is configured to detect a pressure differential value or range across one or more motors 172 of the BHA 170. The one or more motors 172 may each be or include a positive displacement drilling motor that uses hydraulic power of the drilling fluid to drive the drill bit 175, also known as a mud motor. One or more torque sensors 172b may also be included in the BHA 170 for sending data to the controller 190 that is indicative of the torque applied to the drill bit 175 by the one or more motors 172.

The apparatus 100 may additionally or alternatively include a toolface sensor 170c configured to detect the current toolface orientation. The toolface sensor 170c may be or include a conventional or future-developed magnetic toolface sensor which detects toolface orientation relative to magnetic north. Alternatively, or additionally, the toolface sensor 170c may be or include a conventional or future-developed gravity toolface sensor which detects toolface orientation relative to the Earth's gravitational field. The toolface sensor 170c may also, or alternatively, be or include a conventional or future-developed gyro sensor. The apparatus 100 may additionally or alternatively include a WOB sensor 170d integral to the BHA 170 and configured to detect WOB at or near the BHA 170.

The apparatus 100 may additionally or alternatively include a torque sensor 140a coupled to or otherwise associated with the top drive 140. The torque sensor 140a may alternatively be located in or associated with the BHA 170. The torque sensor 140a may be configured to detect a value or range of the torsion of the quill 145 and/or the drill string 155 (e.g., in response to operational forces acting on the drill string). The top drive 140 may additionally or alternatively include or otherwise be associated with a speed sensor 140b configured to detect a value or range of the rotary speed of the quill 145.

The top drive 140, drawworks 130, crown or traveling block, drilling line or dead line anchor may additionally or alternatively include or otherwise be associated with a WOB sensor 140c (WOB calculated from a hook load sensor that can be based on active and static hook load, e.g., one or more sensors installed somewhere in the load path mechanisms to detect and calculate WOB, which can vary from rig to rig) different from the WOB sensor 170d. The WOB sensor 140c may be configured to detect a WOB value or range, where such detection may be performed at the top drive 140, drawworks 130, or other component of the apparatus 100.

The detection performed by the sensors described herein may be performed once, continuously, periodically, and/or at random intervals. The detection may be manually triggered by an operator or other person accessing a human-machine interface (HMI), or automatically triggered by, for example, a triggering characteristic or parameter satisfying a predetermined condition (e.g., expiration of a time period, drilling progress reaching a predetermined depth, drill bit usage reaching a predetermined amount). Such sensors and/or other detection elements may include one or more interfaces which may be local at the well/rig site or located at another, remote location with a network link to the system.

Referring to FIG. 2, illustrated is a block diagram of an apparatus 200 according to one or more aspects of the present disclosure. The apparatus 200 includes a user interface 260, a BHA 210, a drive system 230, a drawworks 240, and a drilling collaboration platform 250. The apparatus 200 may be implemented within the environment and/or apparatus shown in FIG. 1. For example, the BHA 210 may be substantially similar to the BHA 170 shown in FIG. 1, the drive system 230 may be substantially similar to the top drive 140 shown in FIG. 1, the drawworks 240 may be substantially similar to the drawworks 130 shown in FIG. 1, and the drilling collaboration platform 250 may be substantially similar to the controller 190 shown in FIG. 1.

In some implementations, the drilling collaboration platform 250 is a communication control center that may form part of a larger communication system such as apparatus 200. The drilling collaboration platform 250 may include a plurality of modules 262, 264, 266, 268, 270 that communicate with contracted third parties 280A, 280B, 280C to carry out tasks on or relating to the drilling apparatus 100, for example, scheduling a task, assigning the task to a responsible party, organizing and updating the task, communicating with the responsible party to ensure that the task is done on time, and providing a task report. The drilling collaboration platform 250 may include for example, a scheduling module 262 configured to generate schedules for tasks during a drilling operation, a Request For Quote (RFQ)/bid module 264 configured to generate vendor lists and manage communications with third parties, a reporting module 266 configured to automatically generate reports on drilling operations and third parties, a messaging/alerts module 268 configured to generate automatic messages, alerts, and reminders for third parties and receive replies to these messages, and a field ticket module 270 configured to automatically generate field tickets for tasks on the drilling rig. The modules 262, 264, 266, 268, 270 may be independently accessed by a user. In some implementations, the modules 262, 264, 266, 268, 270 are standalone device and may include individual controllers configured to perform operations within the modules. In other implementations, the modules 262, 264, 266, 268, 270 are connected to a central controller such as controller 252. In some implementations, the modules 262, 264, 266, 268, 270 include individual display devices. For example, the scheduling module 262 may be a standalone device such as a computer that is in communication with other modules. In other implementations, the modules 262, 264, 266, 268, 270 are connected to a single display device, such as display 258.

In some implementations, the user interface 260 and the drilling collaboration platform 250 are discrete components that are interconnected via wired or wireless devices. Alternatively, the user interface 260 and the drilling collaboration platform 250 may be integral components of a single system or controller 252. The user interface 260 may include a data input device that permits a user to input data such as tasks to be accomplished on the drilling rig, task updates, schedules, and third party information. The user interface may also be configured to receive drilling data, such as data from sensors on the drilling rig, toolface set points, other set points, limits, and other input data. The user interface 260 may include a keypad, voice-recognition apparatus, dial, button, switch, slide selector, toggle, joystick, mouse, data base and/or other conventional or future-developed data input device. The user interface 260 may support data input from local and/or remote locations. As shown in FIG. 2, the user interface 260 may be configured to receive sensor data from the BHA 210, drive system 230, and drawworks 240 via the rig input 254.

Data entered into the user interface 260 may be stored in a database 263 within the drilling collaboration platform 250. This data may be accessed by the drilling collaboration platform 250 via the execution of one or more database look-up procedures. In general, the user interface 260 and/or other components within the scope of the present disclosure support operation and/or monitoring from stations on the rig site as well as one or more remote locations with a communications link to the system, network, local area network (LAN), wide area network (WAN), Internet, satellite-link, and/or radio, among other communication types. Data stored in the database 263 may include sensor readings, survey results, data input by a user, data associated with other drilling rigs, task scheduling information, and data relating to third parties. For example, the database 263 may be configured to store a vendor list of third parties that have assigned or completed tasks on the drilling rig or on other drilling rigs. The database 263 may include any type of memory device and may be communicatively connected to the controller 252, the modules 262, 264, 266, 268, 270, user interface 260, inputs 254, 261, and display 258. In some implementations, controller 252 provides file management processes for data stored in the database 263, such as organizing data by date received, source, quantity, as well as ranking received data by importance in relation to the drilling operation. For example, data received from sensors on the drilling apparatus 100 indicating a delay on the drilling apparatus may be prioritized over other data sources, such that an operator is notified of the reception of such data and may easily access it. The controller 252 may also automatically correlate information in the database 263 with an applicable third party. For example, all communications to and from a third party casing vendor may be stored together in the database 263 and accessed as a whole by the operator.

The drilling collaboration platform 250 may include a controller 252 configured to communicate data between the various modules 262, 264, 266, 268, 270, perform analysis of drilling data, generate reports, and automatically generate communications.

In some implementations, the display 258 is used to visually present information to a user in textual, graphic, or video form. Depending on the implementation, the display device 258 may include, for example, an LED or LCD display computer monitor, touchscreen display, television display, a projector, or other display device. In some implementations, the display device 258 may form a part of the user interface. Some examples of information that may be shown on the display device 258 will be discussed in further detail with reference to FIGS. 3-5. In some implementations, the display device 258 is used to display a drilling schedule, task lists, the status of third parties, and task reports, as well as other drilling data. For example, the display 258 may be used to display a task schedule generated by the scheduling module 262 and an alert generated by the messaging/alerts module 268.

The drilling collaboration platform 250 may include an external input 261 which may be configured to receive data from external sources such as third parties 280A, 280B, 280C and other external sources, such as other drilling rigs or from a central or remote operation center. The third parties 280A, 280B, 280C may include people, teams, or organizations hired to carry out tasks or other functions on the drilling rig. For example, the drilling collaboration platform 250 may be used to send a RFQ to a first third party 280A and a second third party 280B using the RFQ/bid module 264. The drilling collaboration platform 250 may thereafter receive quotes from the first third party 280A and the second third party 280B with the external input 261. A user may select one of the third parties 280A, 280B based on the quotes. The drilling collaboration platform 250 may communicate the selection of the user to the third parties 280A, 280B with the messaging/alerts module 268. The chosen third party 280A may then communicate an acknowledgement to the selection which may be received by the external input 261. The external input 261 may also be configured to receive drilling data from other drilling rigs locally as well in remote locations. The drilling data may be used in task determination and scheduling by the drilling collaboration platform 250.

The drilling rig may include a number of sensors configured to measure parameters of the drilling rig during a drilling operation. The BHA 210 may include a MWD casing pressure sensor 212 that is configured to detect an annular pressure value or range at or near the MWD portion of the BHA 210, and that may be substantially similar to the down hole annular pressure sensor 170*a* shown in FIG. 1. The casing pressure data detected via the MWD casing pressure sensor 212 may be sent via electronic signal to the drilling collaboration platform 250 via wired or wireless transmission.

The BHA 210 may also include an MWD shock/vibration sensor 214 that is configured to detect shock and/or vibration in the MWD portion of the BHA 210, and that may be substantially similar to the shock/vibration sensor 170*b* shown in FIG. 1. The shock/vibration data detected via the MWD shock/vibration sensor 214 may be sent via electronic signal to the drilling collaboration platform 250 via wired or wireless transmission.

The BHA 210 may also include a mud motor pressure sensor 216 that is configured to detect a pressure differential value or range across the mud motor of the BHA 210, and that may be substantially similar to the mud motor pressure sensor 172*a* shown in FIG. 1. The pressure differential data detected via the mud motor pressure sensor 216 may be sent via electronic signal to the drilling collaboration platform 250 via wired or wireless transmission. The mud motor pressure may be alternatively or additionally calculated, detected, or otherwise determined at the surface, such as by calculating the difference between the surface standpipe pressure just off-bottom and pressure once the bit touches bottom and starts drilling and experiencing torque.

The BHA 210 may also include a magnetic toolface sensor 218 and a gravity toolface sensor 220 that are cooperatively configured to detect the current toolface, and that collectively may be substantially similar to the toolface sensor 170*c* shown in FIG. 1. The magnetic toolface sensor 218 may be or include a conventional or future-developed magnetic toolface sensor which detects toolface orientation relative to magnetic north. The gravity toolface sensor 220 may be or include a conventional or future-developed gravity toolface sensor which detects toolface orientation relative to the Earth's gravitational field. In an exemplary implementation, the magnetic toolface sensor 218 may detect the current toolface when the end of the wellbore is less than about 7° from vertical, and the gravity toolface sensor 220 may detect the current toolface when the end of the wellbore is greater than about 7° from vertical. However, other toolface sensors may also be utilized within the scope of the present disclosure, including non-magnetic toolface sensors and non-gravitational inclination sensors. In any case, the toolface orientation detected via the one or more toolface sensors (e.g., magnetic toolface sensor 218 and/or gravity toolface sensor 220) may be sent via electronic signal to the drilling collaboration platform 250 via wired or wireless transmission.

The BHA 210 may also include an MWD torque sensor 222 that is configured to detect a value or range of values for torque applied to the bit by the motor(s) of the BHA 210, and that may be substantially similar to the torque sensor 172b shown in FIG. 1. The torque data detected via the MWD torque sensor 222 may be sent via electronic signal to the drilling collaboration platform 250 via wired or wireless transmission.

The BHA 210 may also include a MWD WOB sensor 224 that is configured to detect a value or range of values for WOB at or near the BHA 210, and that may be substantially similar to the WOB sensor 170d shown in FIG. 1. The WOB data detected via the MWD WOB sensor 224 may be sent via electronic signal to the drilling collaboration platform 250 via wired or wireless transmission.

Depending upon the implementation, the BHA 210 may also include one or more directional drilling components 226 such as bent housing system components. In some implementations, the directional drilling components 226 may include a drilling motor that forms part of the BHA 170.

The drawworks 240 may include a controller 242 and/or other devices for controlling feed-out and/or feed-in of a drilling line (such as the drilling line 125 shown in FIG. 1). Such control may include rotary control of the drawworks (in versus out) to control the height or position of the hook, and may also include control of the rate the hook ascends or descends.

The drive system 230 may include a surface torque sensor 232 that is configured to detect a value or range of the reactive torsion of the quill or drill string, much the same as the torque sensor 140a shown in FIG. 1. The drive system 230 also includes a quill position sensor 234 that is configured to detect a value or range of the rotary position of the quill, such as relative to true north or another stationary reference. The surface torsion and quill position data detected via the surface torque sensor 232 and the quill position sensor 234, respectively, may be sent via electronic signal to the drilling collaboration platform 250 via wired or wireless transmission. The drive system 230 also includes a controller 236 and/or other devices for controlling the rotary position, speed and direction of the quill or other drill string component coupled to the drive system 230 (such as the quill 145 shown in FIG. 1).

The drilling collaboration platform 250 may be configured to receive data input at the user interface 260 and from the BHA 210, the drawworks 240, and/or the drive system 230, and utilize such data to continuously, periodically, or otherwise determine the status of the drilling rig. This data may be used to generate and update schedules. For example, the drilling collaboration platform 250 may receive anomalous readings from the MWD shock/vibration sensor 214 via the rig input 254, indicating that there is a potential problem with the BHA during a drilling task. The drilling collaboration platform 250 may automatically enter this data into the task schedule such that a subsequent casing task is delayed until the problem is resolved and the drilling task is resumed.

Figure 3:
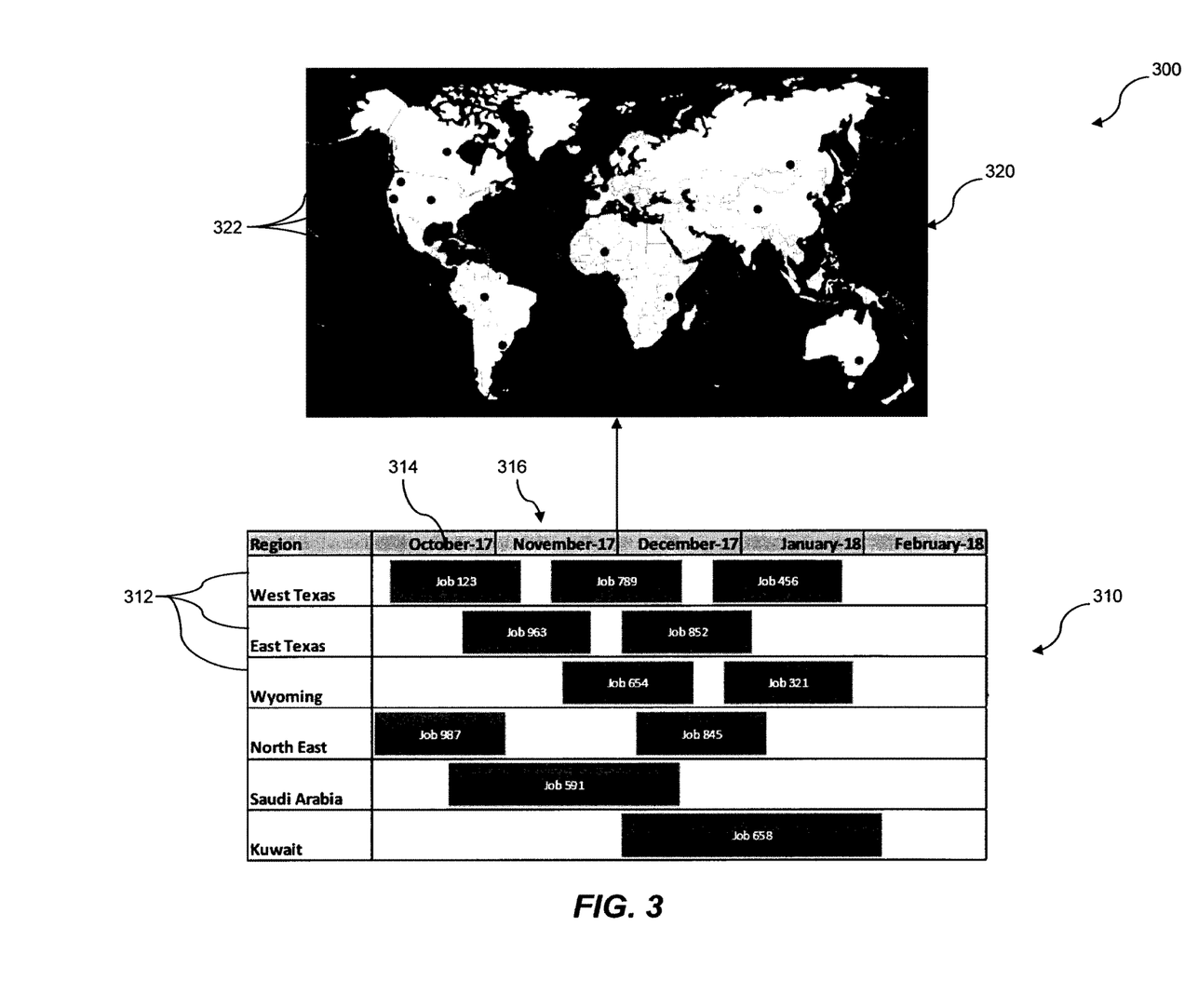
FIG. 3 is a representation of an exemplary display showing a schedule generated by a drilling collaboration system and a map according to one or more aspects of the present disclosure.

FIG. 3 shows a display 300 showing a map 320 and a drilling schedule 310. The display 300 may be generated by the drilling collaboration platform 250 and displayed on a display device such as display 258. The map 320 may show geographical locations for a number of drilling operations. In the example of FIG. 3, sixteen drilling operations are represented by indicators 322. Each drilling operation represented on the map 320 may include one or more regional drilling operations 312, such as those shown in the schedule 310. In some implementations, the map 320 is selectable by a user, such that a user can select an indicator 322 with the user interface 260 and view a schedule associated with the drilling operation represented by the indicator. The user may be able to zoom into certain areas of the map to view more granular data. For example, the user may zoom into the indicator 322 corresponding to North America to view regional drilling operations 312 in the regions of West Texas, East Texas, Wyoming, and the North East. The user may further zoom into each of these regions to view regional drilling operations 312 or even individual drilling rigs within each region.

Selection of the region may cause the drilling collaboration platform to display the schedule 310. The schedule 310 may include drilling tasks associated with one or more drilling operations. In the example of FIG. 3, the schedule 310 shows drilling operations for West Texas, East Texas, Wyoming, the North East, Saudi Arabia, and Kuwait. Each drilling operation has an associated job 314 labeled with a unique reference number. The jobs 314 are generated along a timeline 316 showing a schedule for executing or carrying out the job. In some implementations, the user may input the data used to generate the schedule 310 by using the user interface 260 of the drilling collaboration platform 250. The user may select job 314 to see more detailed information, including individual tasks and associated timelines. The user may also edit a job 314 by changing the title, duration, dates, and drilling information.

Figure 4:
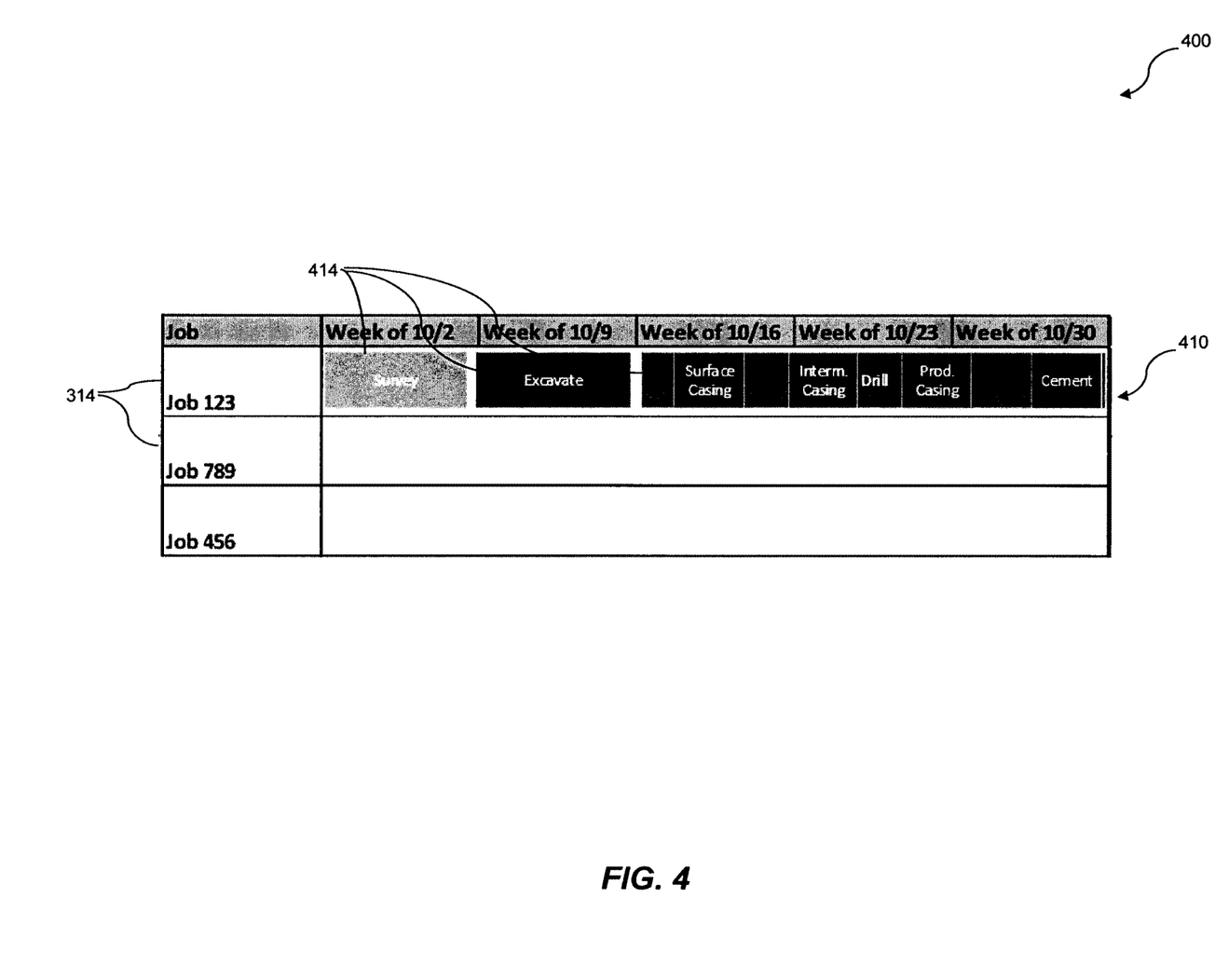
FIG. 4 is a representation of an exemplary display showing another schedule generated by a drilling collaboration system with job and task details according to one or more aspects of the present disclosure.

FIG. 4 shows a display 400 with a job timeline 410. In some implementations, the job timeline 410 is displayed when a user selects one or more of the jobs 314 on the display 300 shown in FIG. 3. The job timeline 410 may show more detailed information for individual tasks 414 within a job 314, including, for example, surveying, excavating, surface casing, intermediate casing, drilling, and cementing. Like the jobs 314, individual tasks 414 may be selected by a user to view more detailed information. The tasks 414 may also be edited by a user. In some implementations, the drilling collaboration platform 250 automatically updates the tasks 414 and associated information based on received data from sensors on the drilling rig. The tasks 414 may also be updated automatically based on communications from third parties. For example, a third party may accept a cementing task. Several weeks before the task is be accomplished, the drilling collaboration platform 250 may receive a notification from the third party stating that the third party is unable to perform the cementing task on the agreed date, but is available at a later date. The drilling collaboration platform 250 may automatically move the date of the task 414 on the job timeline 410 to reflect this notification after approval of the change by the operator. Alternatively, the drilling collaboration platform may then identify a different third party and invite the new third party to perform the desired task on the desired date.

Figure 5:
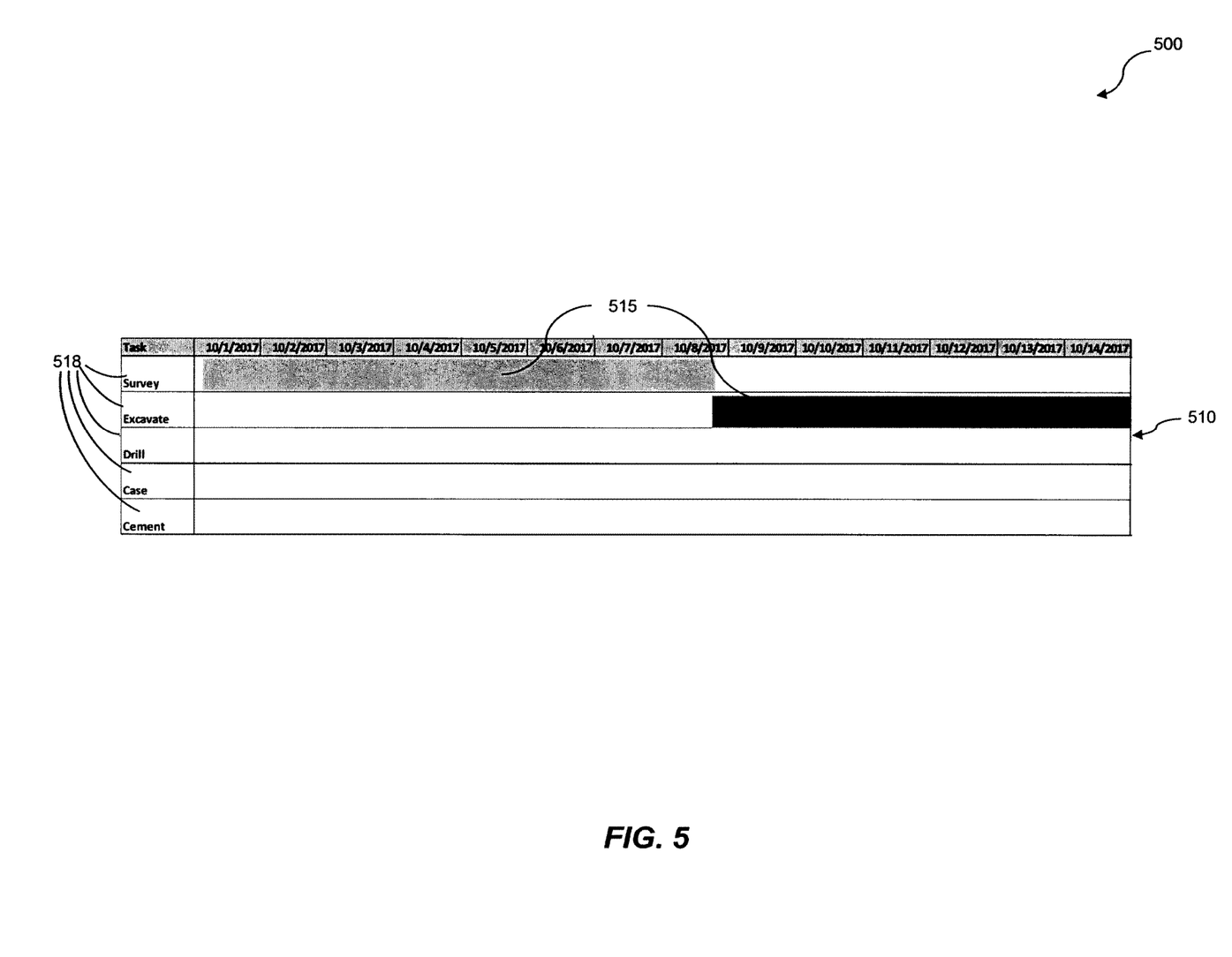
FIG. 5 is a representation of an exemplary display showing another schedule generated by a drilling collaboration platform with job and task details according to one or more aspects of the present disclosure.

FIG. 5 shows a display 500 with a detailed task schedule 510. The task schedule 510 may display individual tasks 518 in a table format. The task schedule 510 may show more detailed information for the tasks 518. Each task 518 may include a task icon 515 that shows an expected duration for the task 518, including a start and finish time. In some implementations, the task schedule 510 is displayed when a user selects one or more of the tasks 414 on the display 400 shown in FIG. 4. In some implementations, the task schedule 510 shows the overlap between tasks 518 with the placement of the task icons 515. The task icons 515 may include information about third parties, such as name of the third party selected to complete the task, budgetary information, contact information, and reminders to be sent to the third party. The individual tasks 518 and task icons 515 may be edited by a user. In some implementations, the drilling collaboration platform 250 automatically updates the individual tasks 518 and associated task icons 515 based on received data from sensors on the drilling rig or communications from third parties.

Figure 6:
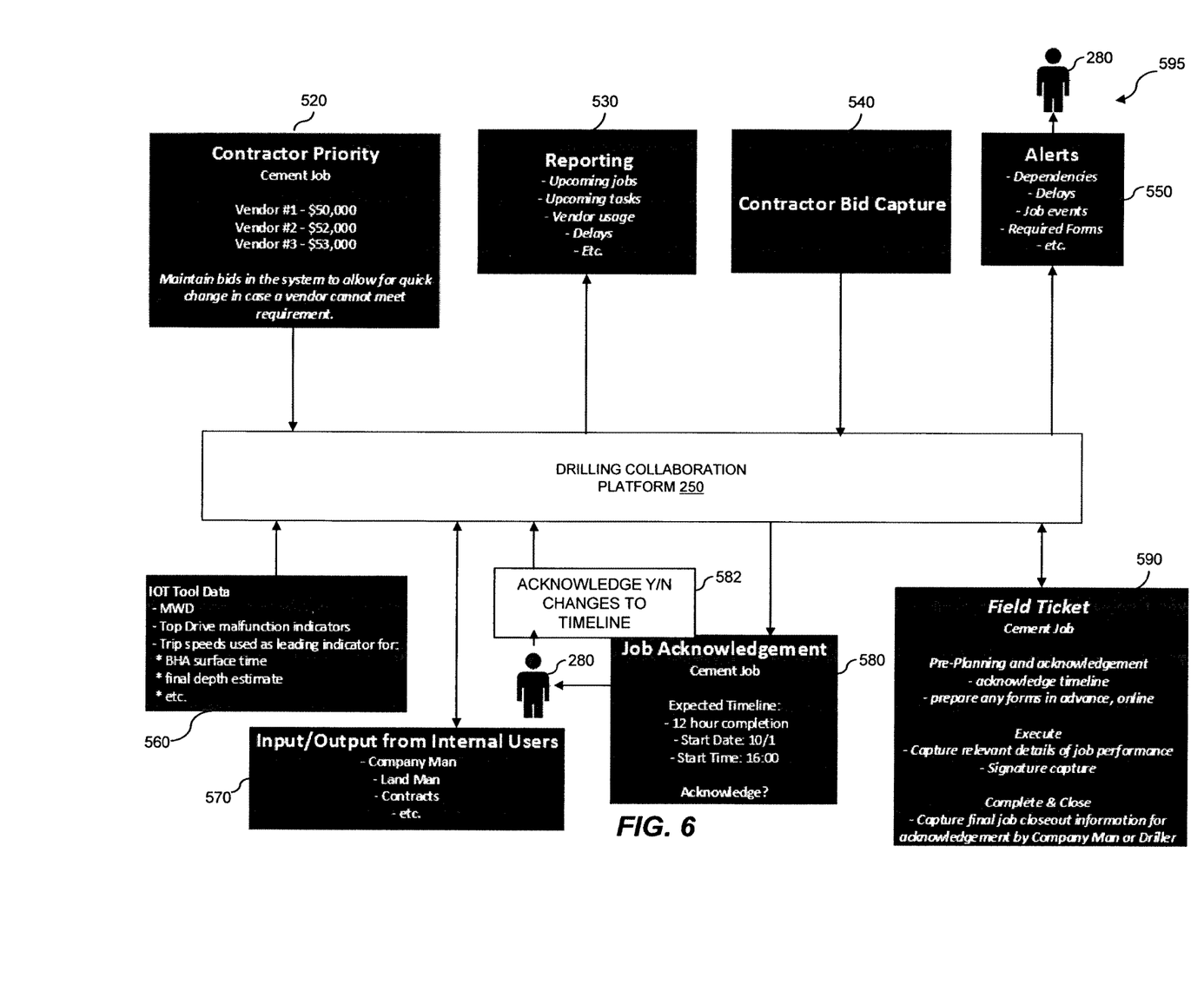
FIG. 6 is a diagram of a drilling collaboration platform with applications and options according to one or more aspects of the present disclosure.

FIG. 6 shows a visualization 595 of a drilling collaboration platform 250 and associated options and applications. The drilling collaboration platform 250 may include a number of applications 520, 530, 540, 550, 560, 570, 580, 590 that may be used to plan and execute the performance of tasks 518. The applications 520, 530, 540, 550, 560, 570, 580, 590 may include options that are accessible by a user using the drilling collaboration platform 250. In the example shown, the contractor priority application 520 may include a list of third parties compiled by the drilling collaboration platform 250. This list may be stored within a memory, such as database 263 as shown in FIG. 2. The third parties may be listed with a bid amount or quote.

In some examples, the drilling collaboration platform 250 may be used to send out a Request for Quote (RFQ) for a task to third parties using the contractor bid capture application 540. Responses to the RFQ may be received by the drilling collaboration platform 250 and organized in a list, such as vendor list. The drilling collaboration platform 250 may automatically organize the third parties by bid amount, previous work, feedback, quality or reliability rating, or other criteria. In some implementations, the user is able to access the contractor application 520 and select a vendor from the vendor list. The remaining vendors on the list are stored in a database of the drilling collaboration platform 250, along with their responses to queries, in case the selected vendor is unable to complete the task. In some implementations, the contractor bid capture application 540 and contractor priority application 520 are carried out by the RFQ/bid module 264. Once a vendor is selected, the drilling collaboration platform 250 may be used to notify the selected third party of the selection. The third party may then accept or decline the selection by sending an acknowledgement message which may be received by job acknowledgement application 580. This acknowledgement message may include details of the job as well as a yes/no acknowledgement 582 from the third party 280. When the acknowledgement is received by the drilling collaboration platform 250, the schedule 510 may be automatically updated with the third party information.

The drilling collaboration platform 250 may include a reporting application 530 which may be used to maintain the schedule 510 and generate reports. The reporting application 530 may be used to generate reports for upcoming jobs, upcoming tasks, vendor usage, and delays. In some implementations, the reporting application may be used to generate a task report after a third party completes a task on the drilling rig. This task report may include a summary of work done, hours recorded, costs, as well as quality metrics. The task report may be entered into the contractor priority application 520 and may be associated with the vendor list so that the user can see this data when choosing a vendor for future tasks. The reporting application 530 may be carried out by the reporting module 266.

The drilling collaboration platform 250 may include an alerts application 550 which may be used to send alerts to users and third parties 280 relating to dependencies, delays, job events, and required forms. In some implementations, the alerts are automatically generated based on data received by the drilling collaboration platform 250. For example, if a third party 280 is selected by a user and an acknowledgement for the third party 280 is received by the job acknowledgement application 580, the alerts application 550 may be used alert the selected third party 280 of a delay on the drilling rig.

The drilling collaboration platform 250 may be configured to include data received from sensors on the drilling rig on the IOT tool data application 560. For example, the drilling collaboration platform 250 may receive drilling rig data associated with MWD, top drive malfunction indicators, trip speeds used as indicators for BHA surface time and final depth estimates. This drilling rig data may be stored within the database of the drilling collaboration platform 250 and may be used to create reports and update tasks within the schedule 510.

The drilling collaboration platform 250 may be configured to communicate with parties such as company men, land men, contractors, through input/output applications 570. Data from these communications may be input into the drilling collaboration platform 250 and output via the reporting application 530 and alerts applications 550. The drilling collaboration platform 250 may also be configured to generate a field ticket for a third party with a field ticket application 590. In some implementations, a field ticket is an electronic or physical form including data relating to the task that is presented to the third party upon arrival at the drilling site. The field ticket may lay out expectations for the third party, timelines, budgets, and contractual information. In some implementations, the field ticket is automatically generated by the field ticket module 270 based on the third party data in the database of the drilling collaboration platform 250, selection of a third party by the user, communications to and from the third party, and information from the task schedule 510. In some implementations, the field ticket is an online form. The field ticket may include signature capture areas. When the field ticket is completed, the drilling collaboration platform 250 may automatically enter the data from the field ticket into the schedule 510 and close out the task 518. The drilling collaboration platform 250 may then create a final task report with all information received during the performance of the task.

Figure 7:
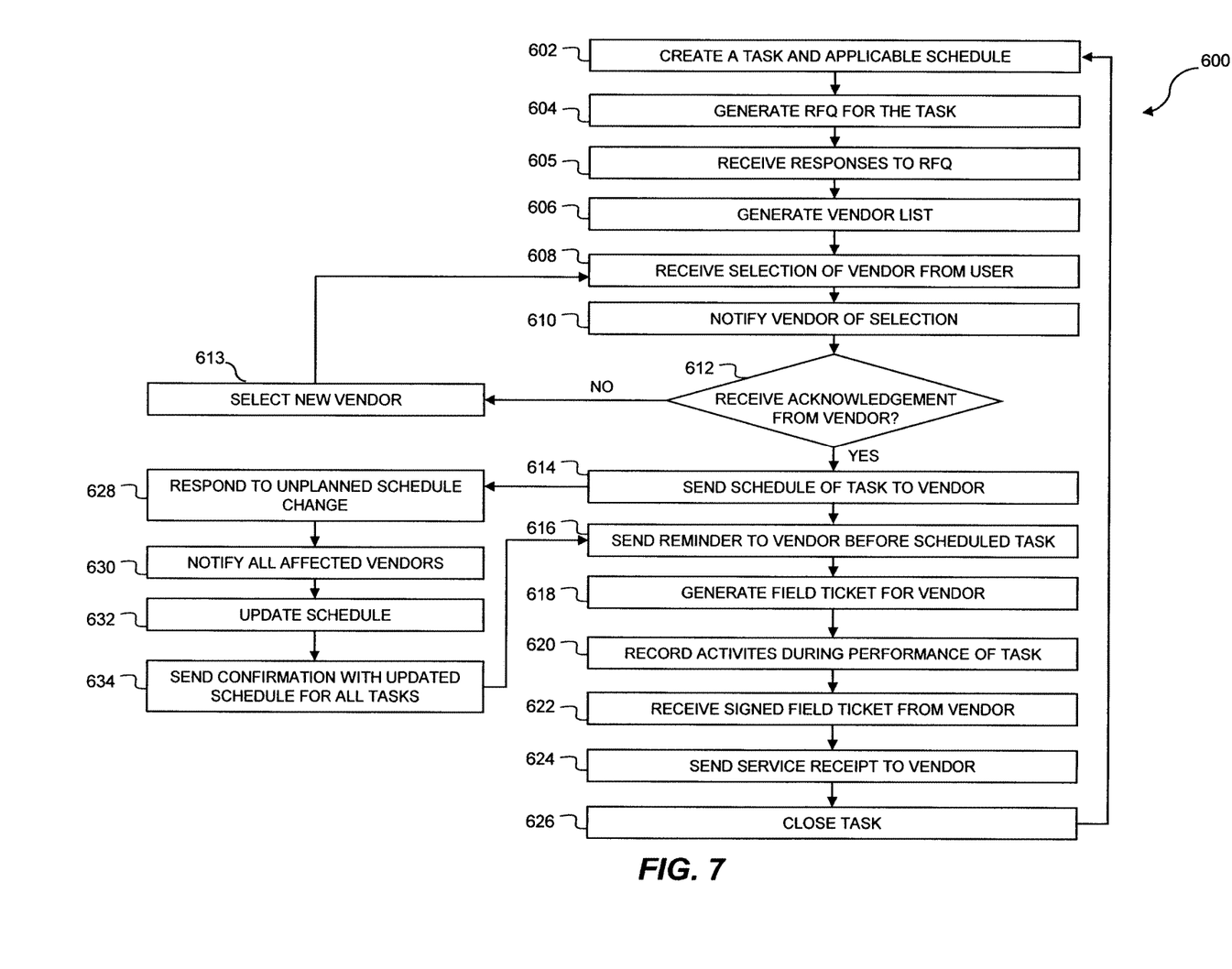
FIG. 7 is a flowchart diagram of an exemplary method of using a drilling collaboration platform according to one or more aspects of the present disclosure.

FIG. 7 is a flowchart diagram of a method 600 for managing drilling communications. In particular, the method 600 represents an exemplary use of a drilling collaboration platform to complete a task on a drilling rig. It is understood that additional steps can be provided before, during, and after the steps of method 600, and that some of the steps described can be replaced or eliminated for other implementations of the method 600. In particular, the drilling collaboration platform 250 as well as other control systems disclosed herein, including those of FIGS. 1 and 2, may be used to carry out method 600.

At step 602, the method 600 may include creating a task and an applicable schedule. The task may be any type of task in a drilling operation such as surveying, excavation, drilling, casing, cementing, and other tasks. The task may be entered into the drilling collaboration platform by a user. The task may include an applicable schedule for completing the task. For example, a surveying task with an expected duration of two days may be entered into a schedule generated by the drilling collaboration platform. The task and schedule may be displayed on a display such as the displays 300 and 400 as shown in FIGS. 3 and 4. In some implementations, the task may be selected by a user once it is entered into the drilling collaboration platform, such that details about the task may be accessed. In some implementations, step 602 may be carried out by a scheduling module or application within the drilling collaboration platform, such as scheduling module 262 as shown in FIG. 2.

At step 604, the method 600 may include generating a Request For Quote (RFQ) for the task. The RFQ may be generated based on the needs of the drilling operation and the requirements of the task. The RFQ may include details about the task, including task specifications, time requirements, and contract information. In some implementations, step 604 is carried out by RFQ/bid module 264 of the drilling rig, as shown in FIG. 2. The drilling collaboration platform may send the RFQ out to a number of vendors for their consideration.

At a step 605, the method 600 may include receiving responses to the RFQ from the vendors. These may be received by an external input of the drilling collaboration platform. The received responses may be stored in a database for consideration. In some implementations, the responses of the vendors are automatically organized by the drilling collaboration platform, for example, by quote amount.

At step 606, the method 600 may include generating a vendor list. The vendor list may be stored in a database of the drilling collaboration platform and may include information about a number of vendors based on past projects completed or available information from other sources, such as the internet. Responses to the RFQ of step 604 may be used to generate the vendor list. For example, an RFQ for a casing task may be sent out to three vendors. The vendors may respond to the RFQ by messages including bids. These responses may be recorded and organized in a list. In some implementations, the vendor list is organized based on criteria such as pricing, quality, availability, experience, or other criteria A user may access the vendor list to select a vendor to complete the task.

At step 608, the method 600 may include receiving a selection of a vendor from the user interface. The controller may record the selected vendor in the database and may generate forms to be sent to the vendor for completing the task.

At step 610, the method 600 may include notifying the vendor of the selection by the user. In some implementations, the drilling collaboration platform is configured to generate a selection notification including task information. This notification may be communicated to the vendor by the drilling collaboration platform. In some implementations, the vendor may decide to accept or decline the selection. The vendor may reply to the selection with an acknowledgement to accept the task.

At step 612, the method 600 may include determining if an acknowledgement is received from the vendor after receiving the selection notification. If no acknowledgment is received, the method 600 may proceed to step 613, where the user is prompted to select a new vendor from the vendor list generated in step 606. The method 600 may then proceed to step 608 where the selection of the vendor is received by the drilling up. If an acknowledgement is received from the selected vendor, the method 600 may proceed to step 614.

At step 614, the method 600 may include sending a schedule of the task to the vendor. The method 600 may also include sending reminders to the vendor closer to the scheduled time for performing the task in step 616. These messages and reminders may transmitted by the messaging alerts module 268 within the drilling collaboration platform.

At step 628, the method 600 may include responding to an unplanned schedule change. These changes may include unplanned changes in availability of a third party, changes in conditions on the drilling rig, equipment problems, weather events, and other unforeseen issues. The drilling rig may receive a notification of the unplanned schedule change from and external source or from the drilling rig itself. The drilling collaboration platform may be configured to store and process the notification of the unplanned schedule change and generate instructions, messages, and/or alerts for employees of the drilling rig as well as third parties.

At step 630, the method 600 may include notifying all vendors affected by the unplanned schedule change. In some implementations, the drilling collaboration platform determines which vendors will be affected by accessing the schedule and associated data. The drilling collaboration platform may send notifications to all affected vendors with a messaging/alerts module. The drilling collaboration platform may also receive responses to these notifications.

At step 632, the method 600 may include updating the schedule. In some implementations, the drilling collaboration platform automatically updates the schedule according to the unplanned schedule change of step 628, such as changing task start and end dates, as schedule changes are received.

At step 634, the method 600 may include sending confirmations with the updated schedule for all tasks to the affected vendors. These confirmations may be sent with the messaging/alerts module. The drilling collaboration platform may also receive subsequent responses to these confirmations from third parties.

At step 616, the method 600 may include sending a reminder to the selected vendor before the scheduled task. This reminder may be sent by a messaging/alerts module of the drilling collaboration platform. The drilling collaboration platform may be configured to automatically send these reminders out at set times before the scheduled task, such as one, two, or three weeks before the task.

At step 618, the method 600 may include generating a field ticket for the vendor. The field ticket may include the expected timeline for completing the task, the bid amount agreed upon the user and vendor, expectations of the user, contractual information, and other information. In some implementations, the field ticket is automatically generated by a field ticket module 270 based on the vendor data in the database of the drilling collaboration platform 250, selection of the vendor by the user, communications to and from the vendor, and information from the task schedule. The field ticket may be presented to the vendor upon arrival to the drilling rig.

At step 620, the method 600 may include recording activities during the performance of the task. For example, a casing operation may be performed on the drilling rig by a selected vendor. Data regarding the number of workers on the drilling site, time taken to complete the task, materials used, and other data may be collected during the performance of the casing operation. This data may be inputted into the database of the drilling collaboration platform and stored for use in reports and other forms.

At step 622, the method 600 may include receiving the completed and signed field ticket from the vendor. This may include uploading the field ticket into the database. The field ticket may be stored in the database of the drilling collaboration platform.

At step 624, the method 600 may include sending a service receipt to the vendor. This may include billing information, a summary of the work complete, and other data collected during the performance of the task. The service receipt may be associated with a vendor in the vendor list discussed in step 606.

At step 626, the method 600 may include closing the task and associated schedule. In an exemplary implementation within the scope of the present disclosure, the method 600 may repeat after step 626, such that method flow goes back to step 602 and begins again with another task. Iteration of method 600 may be utilized to carry out a drilling operation including a number of tasks.

In view of all of the above and the figures, one of ordinary skill in the art will readily recognize that the present disclosure introduces a drilling communication system which may include: a controller in communication with a drilling rig comprising one or more sensors; wherein the controller is configured to: receive user input of a drilling operation task to be executed on the drilling rig; generate a drilling rig schedule to execute the task; receive a selection of a third party to execute the task from the user; notify the third party of the selection of the third party; generate a field ticket based on the task for the third party; receive one or more drilling parameters measured by the one or more sensors during the execution of the task; and generate a task report of the executed task based on the received one or more drilling parameters.

In some implementations, the controller comprises one or more modules for executing tasks. The one or more modules may include one or more of a scheduling module, a RFQ/bid module, a reporting module, an alerts/messaging module, and a field ticket module. The system may include a display device in communication with the controller, wherein the display device is configured to display the drilling rig schedule generated by the controller. The display device may be further configured to display the task report. The system may further include a controller at the drilling rig.

In some implementations, the controller is further configured to: receive a Request For Quote (RFQ) from the user; communicate the RFQ to a plurality of third parties; and receive responses to the RFQ from the plurality of third parties. The controller may be further configured to receive drilling data from a second drilling rig. The controller may be further configured to compare the received one or more drilling parameters to the received drilling data from the second drilling rig. The task report generated by controller may include the comparison of the received one or more drilling parameters and the received drilling data from the second drilling rig.

A method of communicating for a drilling operation is also provided, which may include: receiving, with a controller in communication with a drilling rig, user input of a drilling operation task to be executed on the drilling rig; generating, with the controller, a drilling rig schedule to execute the task; selecting, with the controller, a third party to execute the task; notifying, with the controller, the third party of the selection of the third party; generating, with the controller, a field ticket based on the task for the third party; receiving, with the controller, one or more drilling parameters measured by one or more sensors on the drilling rig during the execution of the task; and generating, with the controller, a task report of the executed task based on the received one or more drilling parameters.

In some implementations, the method may include displaying, with a display device in communication with the controller, the drilling rig schedule generated by the controller. The method may also include displaying, with the display device in communication with the controller, the task report generated by the controller. The method may further include: receiving, with the controller, a Request For Quote (RFQ) from the user; communicating, with the controller, the RFQ to a plurality of third parties; and receiving, with the controller, responses to the RFQ from the plurality of third parties.

In some implementations, the method includes receiving, with the controller, drilling data from a second drilling rig. The method may include comparing, with the controller, the one or more drilling parameters to the received drilling data from the second drilling rig. The task report may be based on a comparison of the received one or more drilling parameters and the received drilling data from the second drilling rig.

A drilling rig management system is also provided, which may include: a drilling collaboration platform in communication with one or more drilling rigs, the drilling collaboration platform comprising: a user input configured to: receive a task selection from a user for a drilling operation task on the one or more drilling rigs; and receive, from the user, a selection for a third party to execute the task; a scheduling module configured to organize one or more aspects of the task in a drilling rig schedule; an alerts/messaging module configured to send and receive alerts and messages from the selected third party; a field ticket module configured to generate a field ticket for the selected third party to execute the task on the one or more drilling rigs; and a reporting module configured to generate a report of the task after it is executed by the selected third party.

In some implementations, the drilling rig management system further includes a display device in communication with the drilling collaboration platform, wherein the display device is configured to display the drilling rig schedule generated by the scheduling module. The drilling collaboration platform further may also include an RFQ/bid module for displaying, to the user, potential third parties for executing the task.

The foregoing outlines features of several implementations so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the implementations introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

Moreover, it is the express intention of the applicant not to invoke 35 U.S.C. § 112(f) for any limitations of any of the claims herein, except for those in which the claim expressly uses the word "means" together with an associated function.

What is claimed is:

1. A method of communicating for a drilling operation, comprising:
   receiving, with a controller in communication with a drilling rig, user input of drilling operation tasks to be executed on the drilling rig; wherein a first task must be completed before a second task is started;
   generating, with the controller, a drilling rig schedule to execute the tasks;
   communicating, with the controller, a Request For Quote (RFQ) for a first task of the tasks to a plurality of third parties;
   receiving, with the controller, responses to the RFQ from the plurality of third parties; wherein the responses comprise data relating to the plurality of third parties;
   selecting, with the controller, and based on the responses to the RFQ, a first third party to execute the first task;
   notifying, with the controller, the first third party that the first third party has been selected to execute the first task;
   generating, with the controller, a field ticket based on the first task for the first third party; wherein the field ticket includes data received in a response to the RFQ from the first third party;
   executing, with the drilling rig, at least a portion of the first task for the third party;
   wherein the drilling rig comprises a drive system and a drawworks;
   measuring, with one or more sensors operably associated with the drilling rig, one or more drilling parameters during the execution of the first task;
   receiving, with the controller, the one or more drilling parameters measured by the one or more sensors during the execution of the first task;
   determining, based on the received one or more drilling parameters, that there is a potential problem with the first task;
   modifying, with the controller, the drilling rig schedule to delay the second task until the potential problem with the first task is resolved;
   sending, with the controller, an alert regarding the delay to the second task to a second third party that is associated with the second task;
   generating, with the controller, a task report of the executed first task based on the received one or more drilling parameters;
   and
   storing, in a database, communications sent to and from the plurality of third parties;
   wherein the communications are correlated in the database by each third party in the plurality of third parties.

2. The method of claim 1, further comprising displaying, with a display device in communication with the controller, the drilling rig schedule generated by the controller.

3. The method of claim 2, further comprising displaying, with the display device in communication with the controller, the task report generated by the controller.

4. The method of claim 1, further comprising receiving, with the controller, drilling data from a second drilling rig.

5. The method of claim 4, further comprising comparing, with the controller, the one or more drilling parameters to the received drilling data from the second drilling rig.

6. The method of claim 5, wherein the task report is based on a comparison of the received one or more drilling parameters and the received drilling data from the second drilling rig.

7. The method of claim 1,
   wherein the drilling rig further comprises the controller; and
   wherein the plurality of third parties comprises any one or more of a contractor, contracted vendor, part-time worker, and specialized crew.

8. The method of claim 1, wherein the drilling operation task comprises any one or more of surface casing, intermediate casing, drilling, and cementing.

* * * * *